US008744611B2

(12) United States Patent
Bornemann et al.

(10) Patent No.: US 8,744,611 B2
(45) Date of Patent: Jun. 3, 2014

(54) APPARATUS FOR CONTROLLING OPERATIONAL FUNCTIONS OF A MACHINE TOOL

(75) Inventors: Armin Bornemann, Marktoberdorf (DE); Rolf Kettemer, Marktoberdorf (DE); Walter Gstir, Schattwald (AT); Peter Pruschek, Pfronten (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 359 days.

(21) Appl. No.: 13/016,365

(22) Filed: Jan. 28, 2011

(65) Prior Publication Data

US 2011/0202166 A1 Aug. 18, 2011

(30) Foreign Application Priority Data

Feb. 2, 2010 (DE) .......................... 10 2010 001 518

(51) Int. Cl.
*G06F 19/00* (2011.01)
*G05B 19/406* (2006.01)
*G05B 19/4063* (2006.01)
*G05B 19/414* (2006.01)
*G06F 9/44* (2006.01)

(52) U.S. Cl.
CPC .......... *G05B 19/406* (2013.01); *G05B 19/4063* (2013.01); *G05B 19/414* (2013.01); *G06F 9/442* (2013.01)
USPC ............................ 700/177; 700/159; 700/160

(58) Field of Classification Search
CPC .............. G05B 19/406; G05B 19/4063; G05B 19/414; G06F 9/442
USPC ......................................... 700/159, 160, 177
See application file for complete search history.

(56) References Cited

U.S. PATENT DOCUMENTS

| 4,962,616 | A | * | 10/1990 | Wittstock ........................ 451/5 |
| 6,477,441 | B1 | * | 11/2002 | Sagasaki ...................... 700/160 |
| 7,146,241 | B2 | * | 12/2006 | Kondo ......................... 700/181 |
| 7,174,235 | B2 | * | 2/2007 | Fujibayashi et al. .......... 700/181 |
| 7,208,899 | B2 | * | 4/2007 | Hashimoto et al. ........... 318/563 |
| 2002/0003414 | A1 | | 1/2002 | Kuramoto |
| 2005/0209730 | A1 | * | 9/2005 | Grund et al. .................. 700/186 |
| 2006/0006565 | A1 | | 1/2006 | Yamaura et al. |
| 2006/0214618 | A1 | * | 9/2006 | Hashimoto et al. ........... 318/445 |
| 2007/0027570 | A1 | * | 2/2007 | Buhler et al. ................. 700/162 |
| 2008/0243299 | A1 | * | 10/2008 | Johnson et al. ............... 700/169 |

(Continued)

FOREIGN PATENT DOCUMENTS

DE         195 22 447 C2     1/1997
DE    10 2007 041 768 A1    3/2009

(Continued)

OTHER PUBLICATIONS

Kuhrke et al.; "Die Energiebilanz muss stimmen;" XP055060870; Aug. 31, 2007.

(Continued)

*Primary Examiner* — Michael D Masinick
(74) *Attorney, Agent, or Firm* — Oliff PLC

(57) ABSTRACT

An apparatus for controlling operational functions of a machine tool, comprising a device for switching on or off a main power supply and at least one device for determining a switch-off time of an operational function of the machine tool in dependence of a selectable criterion.

16 Claims, 4 Drawing Sheets

(56) References Cited

U.S. PATENT DOCUMENTS

Figure 1:
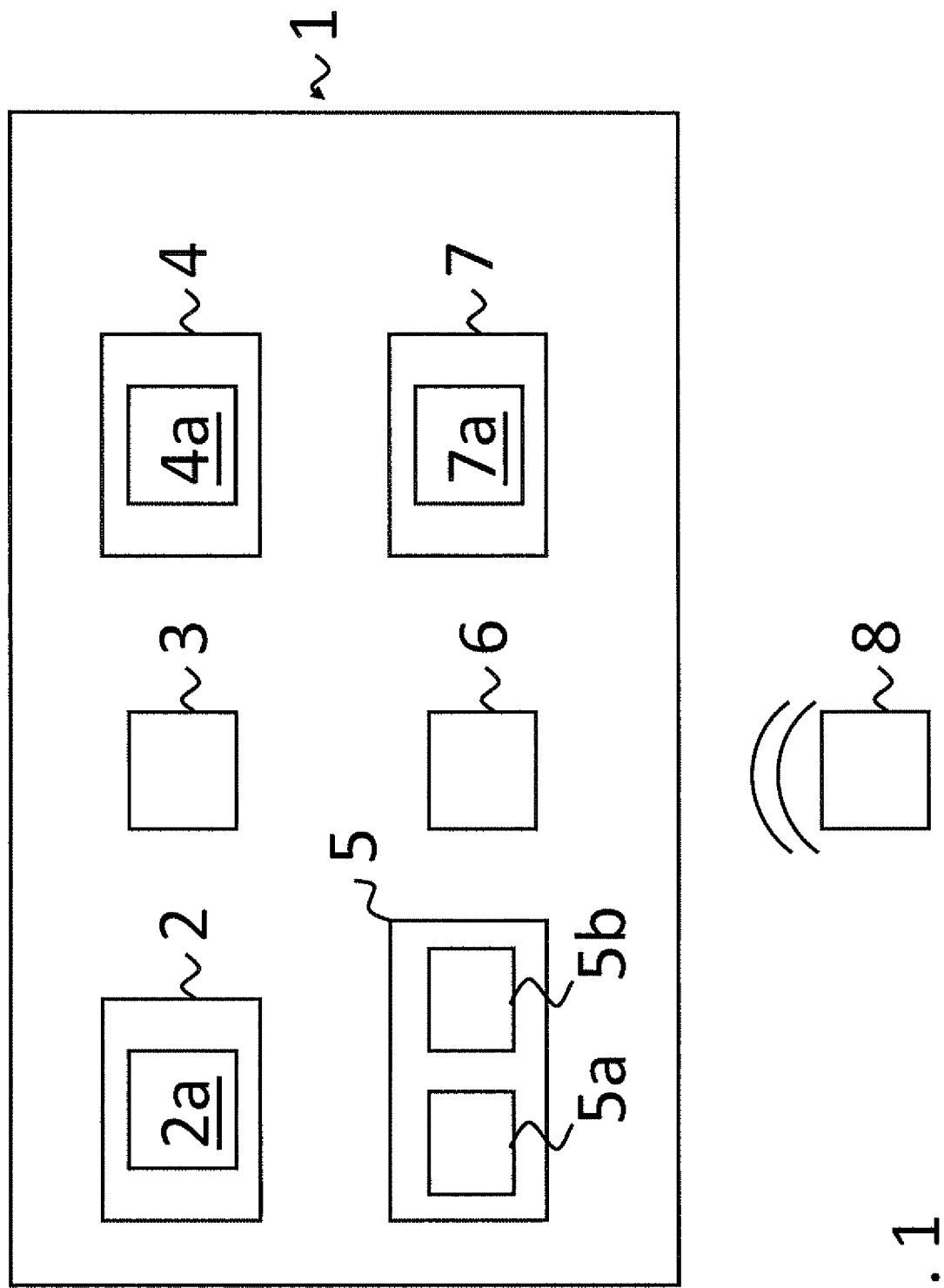

| | | |
|---|---|---|
| 2009/0295580 A1* | 12/2009 | Inoue et al. ............... 340/555 |
| 2010/0030348 A1* | 2/2010 | Scherer ..................... 700/70 |
| 2011/0138385 A1* | 6/2011 | Schmelter et al. ........... 718/1 |

FOREIGN PATENT DOCUMENTS

| | | |
|---|---|---|
| DE | 20 2009 010 490 U1 | 11/2009 |
| EP | 0 909 997 A1 | 4/1999 |
| JP | A 2001-277071 | 10/2001 |

OTHER PUBLICATIONS

Rauch; "Strombedarf in der Produktion senken;" XP055060877; Oct. 15, 2009.

EnviProt; "AutoShutdownManager;" Version 4, Hanbuch; XP055061047; info@enviprot.de; Mar. 7, 2009.

May 7, 2013 Extended European Search Report issued in European Patent Application No. 11153092.9; with partial English-language translation.

* cited by examiner

APPARATUS FOR CONTROLLING OPERATIONAL FUNCTIONS OF A MACHINE TOOL

The present invention relates to an apparatus for controlling operational functions of a machine tool, in particular in connection with the switching off of the machine tool.

The trend towards an environmentally oriented use of resources has become more important in the past few years. In this course, the optimization of the energy balance has also entered many fields of machine construction and today the saving of energy is an important aspect that is already taken into consideration at the research and development stage.

At the same time, when a machine tool is operated, this causes a considerable potential of risk for the operating staff on the one hand and for the smooth running of the machine on the other hand, which can be traced back to the demanding complexity of the machining operations and the increased performance of modern machining centers in the past few years.

The present invention will contribute to saving energy and increasing safety in the operation of machine tools, and it is an object of the invention to provide an apparatus that allows the user to design the operation of a machine tool in its different operating modes in a simple manner so that they will be optimized with respect to energy and safety.

This object is achieved by an apparatus for controlling operational functions of a machine tool according to claim 1.

According to the invention, the apparatus for controlling operational functions of a machine tool comprises an apparatus for switching on or off a main power supply of the machine tool and at least one device for determining a switch-off point in time of an operational function of the machine tool in dependence of a predetermined selectable criterion.

One aspect of the invention is based on the idea to differentiate between the main power supply of the machine tool (voltage, current) and individual operational functions and to provide devices for determining a switch-off point in time which make it possible to separately control the power supply for particular machine tool assemblies and/or components in each case.

Thus, the concept according to the invention allows reducing energy consumption although the machine tool is still activated at the main switch.

Furthermore, the inventive approach makes it possible to flexibly switch on or off the necessary functions without interrupting the main power supply of the machine tool, depending on the operating mode which is determined by the selected machining program and the assemblies and machine components, respectively, activated therefor. Compared to conventional programming, the inventive approach particularly has the advantage that the appropriate determination of the criterion for deciding on the switch-off point in time need not be done within the frame of establishing the subprogram but may be performed flexibly at a later point in time, appropriately, for example, directly by the operator at the machine tool, e.g. after the start of the program.

In this case, the term "switch-off" in the sense of the invention is not limited to a complete switch-off but according to the definition also comprises operating states in which the operational function in question is merely reduced.

A particularly favourable design of the inventive apparatus suggests that the device(s) for determining a switch-off point in time respectively has/have a device for determining the switch-off time by the user. In this embodiment the decisive criterion according to which the switch-off point in time is determined is the time that may be selected in different ways.

Here, by using this device the operator is given the possibility to either determine a particular time or to predetermine a time interval, for example in minutes, hours or days, while the function in question is to remain activated before the switch-off.

This embodiment is particularly helpful for applications in which the operator at the machine tool may already assess at the start of the machining program, for example, for how long the individual operational functions will be required. In this embodiment, the selection of the point in time or the period of time may be made in a particularly effective manner by means of a corresponding software menu which provides input fields for the individual operational functions into which corresponding numerical values can be input. The advantage of this design lies not only in the fact that the power supply of the individual components of the machine tool may be flexibly determined in a simple manner but above all in the fact that the switch-off of the corresponding functions at the predetermined point in time need not be done by the operator himself or herself so that the required staff may be clearly reduced, for example during night-shifts, down to working into unsupervised shifts.

In another embodiment of the inventive apparatus, the criterion for determining the switch-off point in time is the occurrence of a predetermined operating state of the machine tool. In many cases the termination of a run-through of a machining program, for example, is such an operating state where certain operational functions may be switched off when it is reached. However, the invention is not limited thereto, and the operating state to be reached may be any predetermined operating state, such as the termination of a machining substep, a change of tool or the occurrence of a switched-off state of another predetermined operational function of the machine tool. For example, the temperature of the cooling lubricant of the machine tool or the reduced number of circulations of the cooling lubricant before, after or during a particular machining segment may also be determined as decisive criterion for determining the switch-off point in time.

However, it is important in this course that the machine tool be set up such that the various operating states, the occurrence of which may determine the switch-off point in time in accordance with the determination by the user, are selectably predetermined in the machine configuration so that they may be selected, for example, from a predetermined table within the frame of a menu navigation for determining the switch-off course of the overall machine or of single assemblies or operational functions and optionally be adjusted with respect to their parameter value by the operator of the machine tool.

For example, in this embodiment the apparatus for controlling operational functions according to the invention may be configured such that the corresponding operating state is given in a selection list, the device for determining a switch-off point in time of an operational function of the machine tool being adapted such that the corresponding criterion may be selected by the operator, for example, from a pull-down menu in which various operating states are given. Alternatively, e.g. a software-based interrogating procedure may also be provided.

It is an inherent advantage of the inventive construction that certain operational functions may continue to run despite an extensive switched-off state of the machine tool because the machine remains switched on at the main switch. For example, by means of the inventive apparatus the switching off of individual operational functions by the operator may be linked to the condition that safety-relevant operational functions of the machine tool continue to run. In such embodiments the inventive apparatus for controlling operational functions of a machine tool has a device for monitoring safety-relevant equipment. The at least one device for determining a switch-off point in time may be configured such that it is only possible to determine a switch-off point in time for predetermined operational functions if the device for monitoring safety-relevant equipment has not detected any safety-hazardous operating states of the machine tool. In this manner it is possible to ensure that when a machine tool is switched off without supervision, no safety-hazardous operating states may occur because predetermined safety circuits remain activated.

An example for such a safety-hazardous operating state may already be the failure or the switched-off state itself of the device for monitoring safety-relevant equipment so that in this case the switch-off of predetermined operational functions of the machine tool is reliably prevented by the inventive configuration. By pre-setting different switch-off points in time for particular components of the machine tool by using the device for determining a switch-off point in time of an operational function of the machine tool, a guided switch-off of the machine is made possible in a manner that all requirements of a safe stop are fulfilled. Especially the guided switch-off of the controller of the machine tool also belongs thereto, so that sensitive components, such as, for example, hard disks, are protected correspondingly by determining various switch-off points in time or criteria, such as, for example, the shutdown of a hard disk before the switch-off of the main supply.

The criteria of "point in time" (time or period of time) and "event" (attaining an operating state) may also be combined, for example, in the form of determining a switch-off point in time such that 2 minutes after the termination of the subprogram, e.g. the motor of the main drive is switched off.

In preferred embodiments, the devices for determining a switch-off point in time of an operational function of the machine tool are one or more devices from the following group: A device for determining a switch-off point in time when the motor of the main drive of the machine tool is switched off; a device for determining a switch-off point in time when the pressure of a sealing air supply of the machine tool is reduced; a device for determining a switch-off point in time when a power supply of a screen of the machine tool is reduced; a device for determining a switch-off point in time when a power supply of an illuminating device of the machine tool is reduced; a device for determining a switch-off point in time when a temperature of the cooling lubricant of the machine tool is reduced; a device for determining a switch-off point in time when a circulation of the cooling lubricant of the machine tool is reduced; and a device for determining a switch-off point in time when a control computer of the machine tool is placed in an energy-saving mode, although this is no final enumeration. Further examples relate to devices for determining a switch-off point in time when one or more of the following systems or assemblies are switched off: Chip-conveying system, waste pumps, evacuation pump, tool magazine, measuring equipment, such as, for example, laser measuring systems, cooling systems, e.g. for the milling/turning table, main drive or control cabinet, cleaning systems, lubricating systems (oil/air, grease), and hydraulic components for pumps, valve circuits and weight compensation.

The term of operational function in the sense of the invention comprises the various operating modes of all components and assemblies of the machine tools to which current is applied, such as, for example, the main drive, adjustment drives, hydraulic pump system, pneumatic pump system, chip conveyor, tool magazine, controllers, etc. without being limited to the assemblies or components mentioned.

Depending on the devices present for determining a switch-off point in time the apparatus according to the invention may have one or more display devices which are configured to display whether one or more of the machine functions for which the one device for determining a switch-off point in time is provided are in a switched-off state or a switched-on state. This design allows the operator at the machine tool to detect the respective current operating state of the machine tool including the various components thereof with one look.

In an extended design of the inventive apparatus the device for determining a switch-off point in time is configured such that they can only be used by the operator if the operator has a corresponding authorization level required therefor. For this purpose, the apparatus may comprise one or more authorization check devices that grant access to the corresponding devices for determining a switch-off point in time only after correspondingly authenticating data input or receipt of a corresponding signal. Data input may be performed via the keyboard or a chip card and the signal transmission may be made, for example, via a transponder system, as has been described by Applicant e.g. in patent DE 10 2007 041 768.5.

A favourable extension of the inventive apparatus for controlling operational functions of a machine tool provides that the at least one device for determining a switch-off point in time of an operational function of the machine tool has a device for determining the operating state of a function of the machine tool after the switching off.

This may be the function for which a switch-off point in time has been determined. This device allows the user to variably define the switched-off state of the machine function in question depending on the application case. For example, it is possible to determine that the maintaining of the temperature of the cooling lubricant is stopped 5 minutes after the expiration of the subprogram and is resumed when it falls below a specified minimum temperature.

However, the devices for determining the operating state of a function of the machine tool after the switch-off point in time may also be a different operational function that that for which the switch-off point in time was determined. This design is particularly sensible if a follow-up process is to be performed immediately after the switching off of a particular assembly, such as, for example, rotations of the chip conveyor after switching off the main drive once the workpiece machining has been completed. In this manner, a certain follow-up movement of particular assemblies can be realized which so far has only been possible by the operator manually triggering the respective operational function in each case.

Concerning the main power supply of the machine tool, an essential advantage of the present invention is also the fact that the machine tool may still remain activated at the main switch when switch-off points in time for the corresponding machine component and/or functions are determined by the operator because it is not necessary in view of the inventive configuration of the machine tool to provide a tap of the required control voltages and the electric circuits for the power supply of the remaining required components upstream of the main switch. Thereby, the required special components and their processing in the control cabinet are eliminated. In order to fulfill the relevant safety standards, the machine may be configured such that when the power supply is switched off by operating the main switch of the machine tool the at least one device for determining a switch-off point in time is activated so that the corresponding function is switched off without delay.

The concept of the invention is considerably supplemented by the fact that the apparatus for controlling operational functions of a machine tool additionally has at least one device for determining a restart point in time when an operational function of the machine tool is re-activated after the switching off.

Due to such devices for determining a restart point in time, the components in question of a machine tool may be returned to operation, for example in a time-controlled manner, without the operating staff having to enter commands or push keys to be operated manually at the restart point in time. In this manner it becomes possible to return the various operational functions of the machine tool successively to operation, for example at the beginning of a new shift, without the loads unnecessarily wasting energy even if the staff for machine operation is reduced.

The state that particular operational functions of the machine are in a "wake-up" mode after the switching off, that is, they have a reduced operational function but are not completely switched off, may be shown by a corresponding display, for example, a flashing signal lamp on the control panel.

A sensible design of the device for determining a restart point in time comprises a device for determining the switch-on time by the operator. However, the restart point in time may also be event-triggered, wherein the event may be the occurrence of a particular operating state of the machine tool.

In a particularly preferred embodiment of the inventive apparatus a plurality of restart points in time may be suitably selected by menu-navigation from a group of events, that is, occurrence of a particular operating state of the machine tool and/or by presetting a point in time predetermined by time or time interval. In this manner, for example, a systematic warming-up of the machine for resuming the operation may be configured in dependence of the requirements of the machining steps as planned or given by the upcoming program.

In analogy to the above-described device for determining a switch-off point in time, the device for determining a restart point in times may also have a device for determining an operating state of a function of the machine tool after the point of time of restart. This may relate to the operational function activated by the restart, however, it may also relate to another operational function of the machine tool that does not correspond to the operational function for which the restart point in time was determined.

A preferred device for determining a restart point in time is one or more of the a device from the following group: a device for determining a restart point in time when the main power supply of the machine tool is switched on again after complete switching off; a device for determining a restart point in time when the motor of the main drive of the machine tool is switched on again after switching off; a device for determining a restart point in time when the pressure of a sealing air supply of the machine tool is raised again after switching off; a device for determining a restart point in time when a power supply of a screen of the machine tool is increased again after switching off; a device for determining a restart point in time when a power supply of an illuminating device of the machine tool is increased again after switching off; a device for determining a restart point in time when a temperature of the cooling lubricant of the machine tool is increased again after switching off; a device for determining a restart point in time when a circulation of the cooling lubricant of the machine tool is increased again after switching off; and a device for determining a restart point in time when a control computer of the machine tool is re-activated, although this does not represent al final enumeration either. Further examples relate to a device for determining a restart point in time when one or more of the following systems or assemblies is switched on: chip conveyor system, waste pumps, evacuation system, tool magazine, measuring equipment, such as, for example, laser measuring systems, cooling systems, e.g. for the milling/turning table, main drive or control cabinet, cleaning systems, lubricating systems (oil/air, grease), and hydraulic components for pumps, valve circuits and weight compensation.

A considerable advantage of the inventive devices for determining a switch-off point in time and for determining a restart point in time of an operational function of the machine tool, respectively, consists of the fact that by switching off or restarting operational functions of the machine tool step by step process courses may be preset which so far had to be done by the operator of the machine tool by manual operation. In this manner it becomes possible to realize the knowledge and experience of the persons in question as machine instructions which then can be used on every machine, even in supervision-free operation. Furthermore, an important contribution to automated operation is made in connection with switching off and restarting the machine tool.

In addition, the inventive apparatus may have the already mentioned device for monitoring safety-relevant equipment and the device for determining a restart point in time may be configured such that certain operational functions cannot be re-activated if the device for monitoring safety-relevant equipment detects a safety-hazardous operating state of the machine tool.

In a preferred embodiment this device for monitoring safety-relevant equipment is designed as a sensor that detects whether there are any persons in the working space of the machines. However, the invention is not limited thereto and the device for monitoring the safety-relevant equipment may monitor e.g. the access to the tool magazine or the setup station, the closing of the cabinet door by correspondingly suitable sensors (light barriers etc.). A list of significant major sources of risk and main sources of this risk in machining centers is given in summary in table a of standard DIN EN 12417. This standard cites numerous examples for safety-relevant equipment of a machine tool, which come into question for monitoring, without having to individually enumerate this equipment here which per se is known.

The inventive apparatus may have a receiver for receiving a signal for controlling one of the devices for determining a switch-off point in time and/or one of the devices for determining a restart point in time. For example, the receiver may be equipped to receive the control signal by means of a Short Message Service (SMS) short message via a telecommunications network.

In addition, in an advantageous design of the apparatus according to the invention an inquiry device is provided that can be activated via a telecommunications network and is equipped to transmit data concerning the operating state of the machine tool following a remote inquiry via a telecommunications network. However, the data transmission for transmitting operating state data to an external station may also be made continuously or periodically without an inquiry. Thereby it is made possible, for example, that an upcoming program of a machine tool is only started via a mobile radio unit if in consequence of the inquiry it is ensured that sufficient workpieces and/or tools in an operable state are available. Another example may relate to a safety-relevant state of the machine tool whereby the remote inquiry first clarifies if safety circuits report the safe state, for example, whether the door to the working space is closed in sleep mode so that an unsupervised remote start of the machine tool is made possible while complying with corresponding safety regulations.

Figure 2:
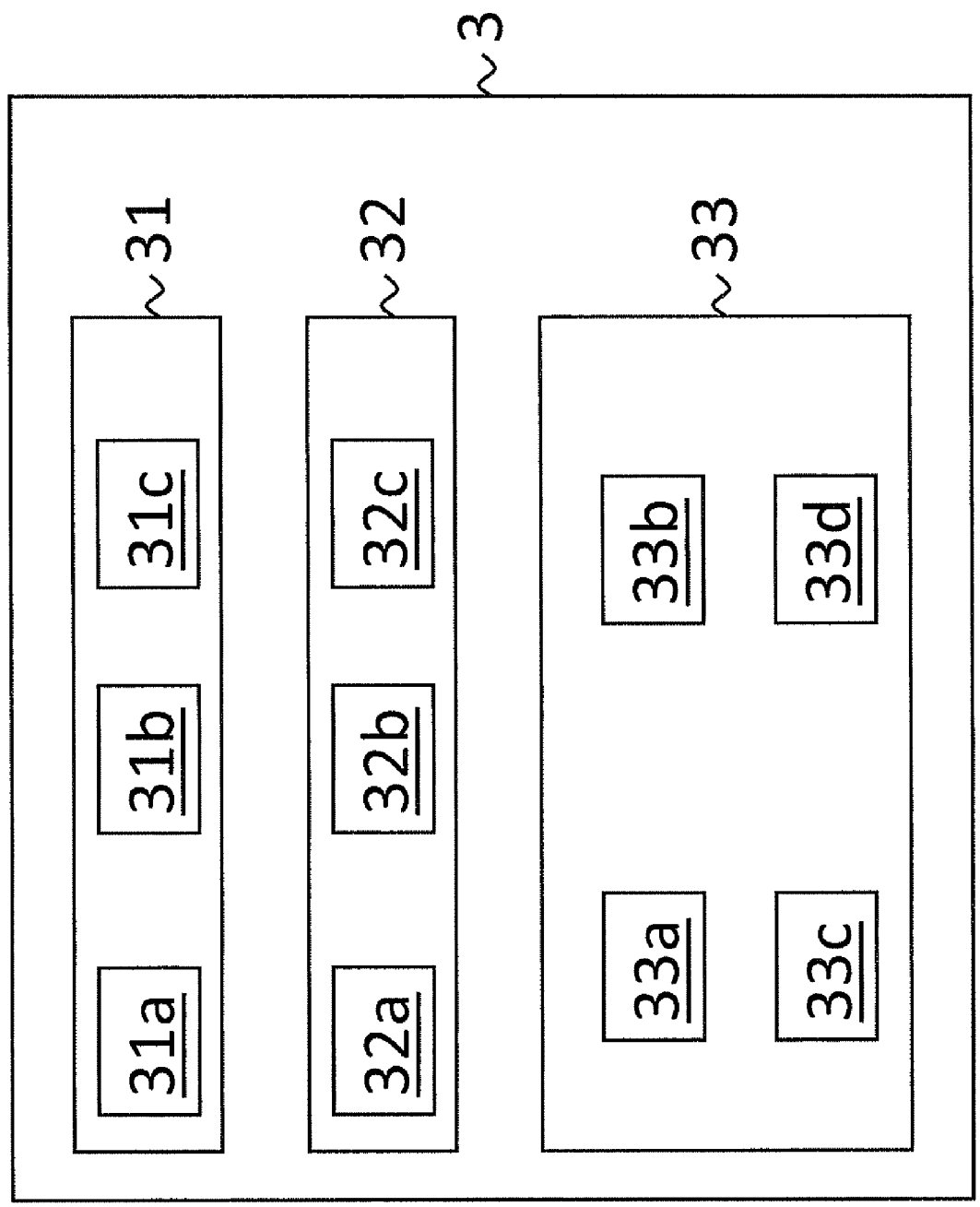
Figure 3:
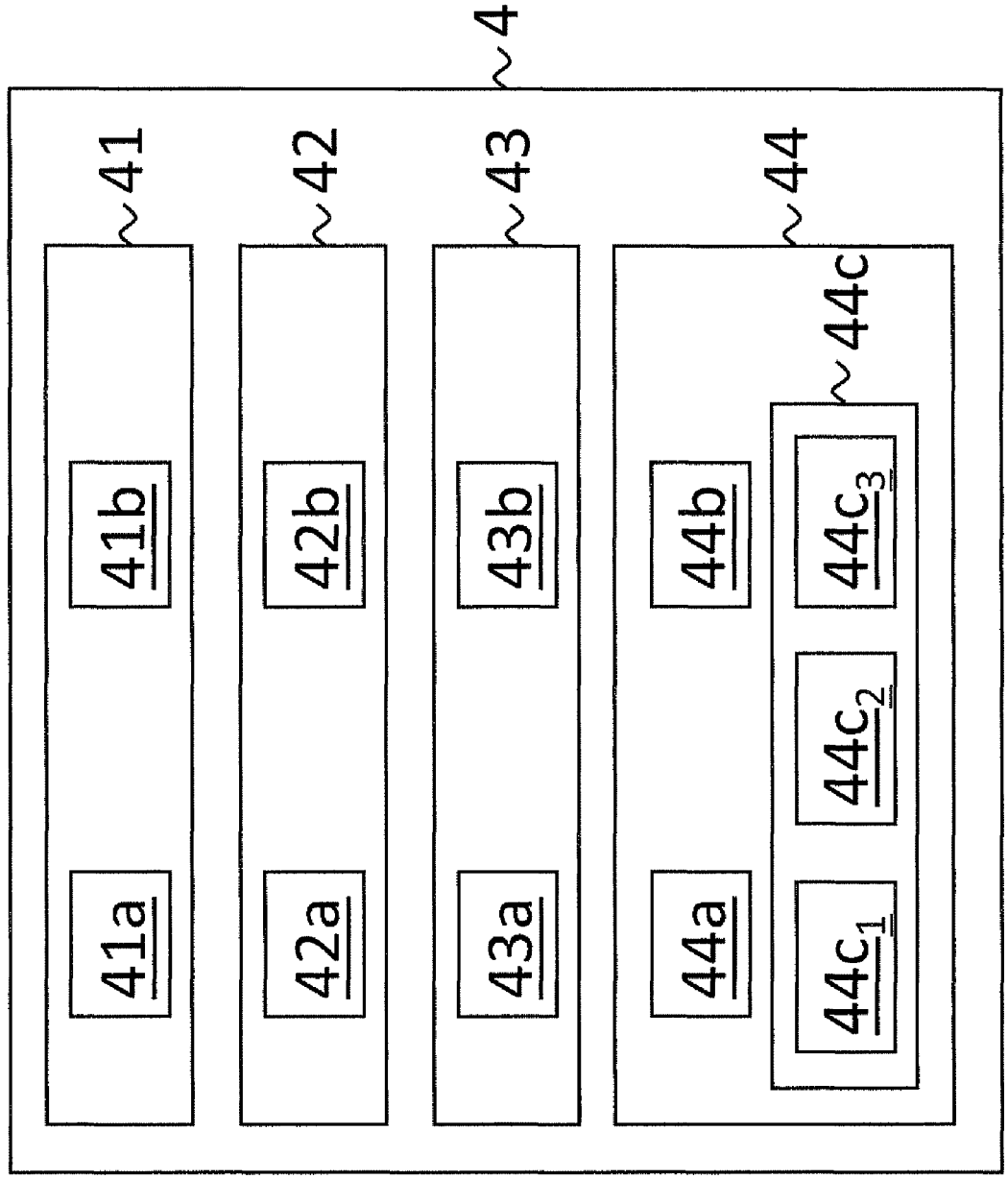
Figure 4:
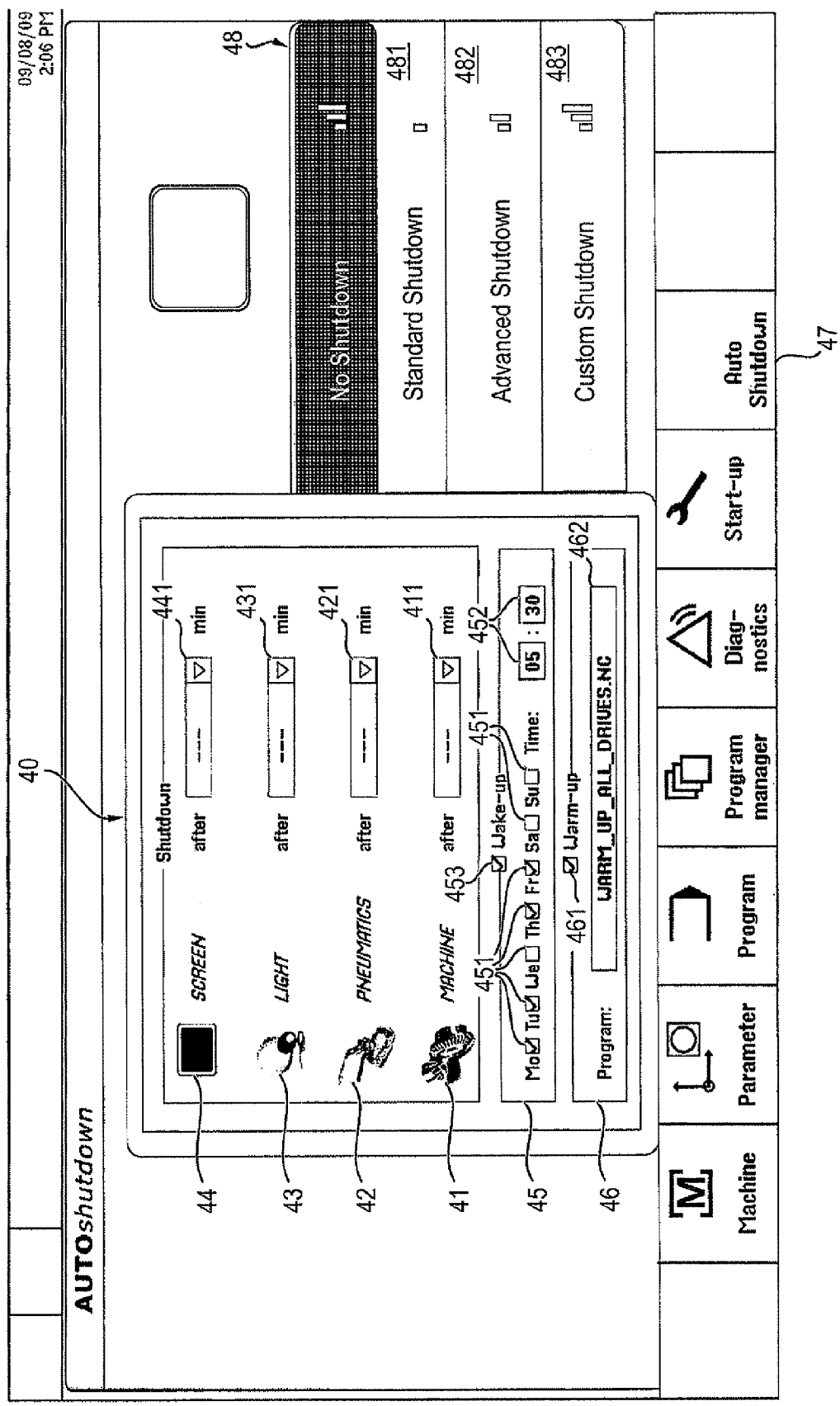

In the following, further particularly favorable embodiments of the present invention are described with reference to the Figures, in which:

FIG. 1 schematically shows the structure of an embodiment of an inventive apparatus for controlling operational functions of a machine tool, FIG. 2 shows an embodiment of a device for determining a switch-off point in time of an operational function of the machine tool in dependence of a selectable criterion, as shown in FIG. 1, FIG. 3 shows an embodiment of an inventive device for restarting an operational function of the machine tool after switching off, as shown in FIG. 1, and FIG. 4 shows an example of a menu navigation of an inventive apparatus for controlling operational functions of a machine tool via the control panel of the machine tool.

In a schematic view, FIG. 1 shows the overall structure of an inventive apparatus a for controlling operational functions of a machine tool by means of which the aspects concerning safety supervision and remote inquiry shall be illustrated in particular.

The inventive apparatus a has a conventional main power supply switch 2, and a locking switch 2a protecting the main switch 2 against unintentional switching off of the machine tool. Moreover, the inventive apparatus a has a device 3 for determining a switch-off point in time of an operational function of the machine tool in dependence of a selectable criterion, The reference numeral 4 denotes a device for determining a restart point in time when an operational function of the machine tool is re-activated after switching off. Furthermore, the inventive apparatus 1 has a device 5 for monitoring safety-relevant equipment of the machine tool. A receiver for receiving a signal for controlling the devices for determining a switch-off point in time and for determining a restart point in time of an operational function of the machine tool is denoted by the reference numeral 6. An inquiry device 7 is connected to the receiver 6, by means of which data for monitoring the operating state of the machine tool can be requested by remote inquiry via a telecommunications network. For this purpose the inquiry device 7 has a corresponding transmitter 7a for transmitting operating state data to an external station 8. In the embodiment as stated the inventive apparatus 1 is configured such that the transmitting apparatus 7 transmits the operating state data in question only on inquiry after receipt of a corresponding inquiry signal via a telecommunications network (e. g. GSM) by using the transmitter 7a. In the present embodiment, this is operating state data that can provide information whether a program for machining is coming up and whether sufficient tools and workpieces for machining are available. After receipt of corresponding confirmation messages from the inquiry device 7 that were transmitted via the transmitter 7a a restart signal in the form of a program start command can be transmitted by SMS to the receiver 6 through the external station 8, which in the present embodiment is a mobile radio unit.

In the present embodiment the monitoring device 5 comprises a sensor 5a monitoring a door to the working space as to whether it is opened or closed. Furthermore, the monitoring device 5 has a sensor 5b monitoring the working space for the presence of persons. In the following embodiment the inventive apparatus 1 is configured such that a restart preventing device 4a, which is part of the device for determining a restart point in time of an operational function of the machine tool, does not allow the restart of the machine tool if the sensor 5a detects that the door is opened and/or the sensor 5b detects that there is a person in the working space.

FIG. 2 shows an embodiment of the inventive device 3 for determining a switch-off point in time of an operational function of the machine tool, as shown in the embodiment of FIG. 1. The device 3 comprises a device 31 for determining a switch-off point in time when the motor of the main drive of the machine tool is switched off; a device 32 for determining a switch-off point in time when a pressure of a sealing air supply of the machine tool is reduced; a device 33 for determining a switch-off point in time when the temperature of the cooling lubricant of the machine tool is reduced; and a device 34 for determining a switch-off point in time when a control computer of the machine tool is placed in an energy-saving mode.

The device 31 for determining a switch-off point in time when the motor of the main drive of the machine tool is switched off has a device 31a by means of which the user can enter a concrete point in time, for example, Feb. 1, 2010, 07:30 a.m. when the motor of the main drive of the machine tool is to be switched off. By using the device 31b the user may determine that the motor of the main drive is switched off after expiration of a particular period of time, for example 3.5 hours. Consequently, the devices 31a and 31b are devices for determining the switch-off time.

The device 31c is a device for determining a switch-off point in time of an operational function of the machine tool in dependence of the occurrence of a predetermined operating state of the machine tool. More precisely, this embodiment is a device for determining a switch-off point in time that determines the switch-off point in time such that the switching off of the operational function occurs after the run-through of the upcoming program for workpiece machining. In other words, it is the event-triggered determination of a switch-off point in time for an assembly of the machine tool. While the devices 31a, 31b for determining the switch-off time are devices where the user can enter the time or period of time via the keyboard, the device 31c is designed such that particular operating states are predefined which are offered to the user for selection in the form of a pull-down menu. In the following embodiment referring to the device 31 for determining a switch-off point in time of a motor of the main drive of the machine tool the operator is offered the run-through of the upcoming program. By selecting the corresponding devices 31a, 31b, 31c, the user can determine the switch-off point in time of the motor of the main drive by using the shown device 31 in a flexible manner, The device 32 for determining a switch-off point in time when a pressure of a sealing air supply of the machine tool is reduced has devices 32a and 32b for determining the switch-off time that correspond to the above-described devices 31a and 31b of the device 31 for determining a switch-off point in time when the motor of the main drive of the machine tool is switched off. Moreover, the device 32 has a device 32c for determining a switch-off point in time when a pressure of a sealing air supply of the machine tool is reduced in dependence of the occurrence of a predetermined operating state of the machine tool. In the present embodiment relating to the device 32 there are three different operating states available for the operator by using the device 32c, that is, 10 minutes, 20 minutes and 30 minutes after switching off of the motor of the main drive of the machine tool. In this manner the operator is enabled to continue the sealing air supply for a certain amount of time after switching off the main drive in order to thus ensure the reliable removal of adhering particle accumulations.

The device 33 for determining a switch-off point in time when the temperature of a cooling lubricant is reduced has analogous devices 33a and 33b which are designed as is devices for determining the switch-off time, as described above.

In addition thereto, the device 33 has a device 33c by means of which it is possible to determine that the maintaining of the temperature of the cooling agent after the stop of the motor of the main drive of the machine tool is first switched off, however, is restarted when a temperature of e.g. 13° C. is reached. This input is made by using the device 33d which represents an embodiment for a device for determining an operating state of a function of the machine tool in the switched-off state.

By using the device 3 shown in FIG. 2 the operator of the machine tool may determine a step-wise shutdown of the various operational functions of the machine tool by means of different preset criteria. In this manner an operationally safe switching off of the machine tool at reduced energy consumption as compared to conventional machine tools is made possible because it is ensured that none of the assemblies of the machine tool has to be operated longer than necessary. Moreover, by increasing the degree of automation the need for operators at the machine tool may be reduced.

FIG. 3 shows an embodiment of the device 4 in detail for determining a restart point in time of an operational function of a machine tool after switching off in the meantime, as shown in FIG. 1.

The device 4 comprises a device 41 for determining a restart point in time when a main power supply of the machine tool is restarted after switching off.

Said device 41 is equipped with devices 42a and 41b which are designed as devices for determining a restart time in a direct manner by inputting the time in question or by inputting a time interval in analogy to the above-described devices 31a and 31b.

Furthermore, the shown device 4 for determining a restart point in time has a device 42 for determining a restart point in time of the feed motors and a device 43 for determining a restart point in time when the motor of the main drive of the machine tool is restarted. The devices 42 and 43 have devices 42a and 42b, respectively, and 43a and 43b, respectively, for determining the switch-on time of the motors in question. By using these devices 42 and 43 it is possible, for example, to adjust a systematic warming-up of corresponding assemblies before the start of the subprogram. The warming-up in the sense of the invention, however, is not limited to these embodiments relating to feed motors and main drive motors, but may comprise all assemblies, such as, for example the maintaining of the temperature of the machine bed etc., which are necessary for precision machining.

Furthermore, the device for determining a restart point in time 4 has a device 44 by means of which the restart point in time of a control computer of the machine tool can be determined. The corresponding devices 44a and 44b for determining the restart time of the control computer are designed in analogy to the above-explained devices as devices for determining the switch-on time. Moreover, the device 44 has a device 44c by means of which a subprogram can be started. In the present embodiment, this device has a device 44c1 which is adapted to make the start of the subprogram dependent on the condition that the warming-up of the motors, which has been determined by the devices 42 and 43, has been performed for a particular period of time to be input by the user. In this manner it is possible to preset that a program is started only after a predetermined warming-up time of the motors. Moreover, the device 44c has the further devices 44c2 and 44c3 which in turn are formed analogously to the above-described devices a, b as devices for determining a restart time of a subprogram by inputting the time and of the period of time, respectively, remaining until then.

FIG. 4 shows an embodiment of a menu navigation of a control computer as an embodiment of an inventive apparatus for controlling operational functions of a machine tool that has a device for determining a switch-off point in time of an operational function of the machine tool and a device for determining a restart point in time of an operational function of the machine tool which are designed as devices for determining the time.

The corresponding menu "auto shutdown" is called up by selecting the field 47.

In this embodiment, as shown in FIG. 4, the device 40 for determining a switch-off point in time of an operational function of this machine tool comprises a device for determining a switch-off point in time when the motors of the drives ("machine") 41 of the machine tool are switched off, a device for determining a switch-off point in time when the pneumatic pump system ("pneumatics") 42 is switched off, a device for determining a switch-off point in time when an illumination ("light") 43 of the machine tool is switched off, and a device for determining a point in time when the monitor ("screen") 44 of the control computer of the machine tool is conveyed into an energy-saving mode. These devices 41-44 are respectively adapted as devices for determining the switch-off time in question wherein the amount of time until the switching off can be entered in minutes into the respective fields 411, 421, 431 and 441 by the operator ("shutdown after . . . minutes").

The lower part of FIG. 4 shows the menu navigation with respect to the device 45 for determining a restart point of an operational function of the machine tool which in this embodiment is designed as a device for determining a restart point in time when the functions of drive motors, pneumatic pump system, illumination and screen that were switched off by the devices 41-44 can be restarted. The activation of the device for determining a restart point in time is made via the input field 453 ("Wake-up"). In this case the user inputs the weekday ("Mo, Tu, We, Th, Fr, Sa, Su") in field 451 and the time ("Time") in field 452 when the functions in question are to be re-activated. Furthermore, this menu makes it possible to start a device for warming up the drives the specific instructions of which are specified in the program ("warm_up_all_drives.nc") that can be selected by the user in field 46. This program makes the associated motors run for 30 minutes. The activation of this warming-up function at the point in time of restart is made possible by the input field 461 ("Warm-up").

The menu field 48 gives the possibility to select various profiles 481, 482 and 483 stored in advance that make alternative menus appear, depending on the configuration of the inventive apparatus.

However, the menu navigation shown in FIG. 4 is merely exemplary and may be performed e.g. by a corresponding menu-navigated inquiry procedure that inquires a partial or complete switching off or restart of the assemblies in question immediately or at a later point in time.

In this respect the embodiments of the invention as described are merely shown for illustrating the various functions, and the various functions and associated features may be combined by a person skilled in the art in a suitable manner in order to provide embodiments that correspond to a particular given application purpose.

The invention claimed is:

1. An apparatus for controlling operational functions of a machine tool, comprising:
   a device for switching on or off a main power supply; and
   at least one device for setting, in dependence of a selectable criterion and independently of whether or not said main power supply is switched on or off, a predetermined point in time at which an operation function of the machine tool is switched-off automatically, said device for setting a predetermined point in time being configured such that different predetermined operation functions of the machine tool and a point in time at which a selected operation function is shut down automatically or a time period after which the selected operation function is shut down automatically are selectable by a user from a software menu installed on said apparatus.

2. The apparatus for controlling operational functions of a machine tool according to claim 1, wherein the apparatus has a device for monitoring safety-relevant equipment and that the at least one device for determining a switch-off point in time is configured to allow the determination of a switch-off point in time for predetermined operational functions only if the device for monitoring safety-relevant equipment does not detect any hazardous operating states of the machine tool.

3. The apparatus for controlling operational functions of a machine tool according to claim 1, wherein the device for determining a switch-off point in time of an operational function of the machine tool is a device from the following group of devices:
   a device for determining a switch-off point in time when the motor of the main drive of the machine tool is switched off;
   a device for determining a switch-off point in time when the pressure of a sealing air supply of the machine tool is reduced,
   a device for determining a switch-off point in time when a power supply of a screen of the machine tool is reduced,
   a device for determining a switch-off point in time when a power supply of an illuminating device of the machine tool is reduced,
   a device for determining a switch-off point in time when a temperature of a cooling lubricant of the machine tool is reduced,
   a device for determining a switch-off point in time when a circulation of the cooling lubricant of the machine tool is reduced,
   a device for determining a switch-off point in time when a control computer of the machine tool is placed in an energy-saving mode.

4. The apparatus for controlling operational functions of a machine tool according to claim 2, wherein the apparatus has one or more display devices which is/are configured to display whether one or more of the machine functions are in a switched-off state or a switched-on state.

5. The apparatus for controlling operational functions of a machine tool according to claim 1, wherein at least one device for determining a switch-off point in time has a device for determining an operating state of a function of the machine tool in a switched-off state.

6. The apparatus for controlling operational functions of a machine tool according to claim 5, wherein the device for determining the operating state of a function of the machine tool in a switched-off state is adapted to determine the state of the operational function after switching off for that function for which the switch-off point in time is determined.

7. The apparatus for controlling operational functions of a machine tool according to claim 5, wherein the device for determining the operating state of a function of the machine tool in a switched-off state is adapted to determine the state of the operational function after switching off for another operational function of the machine tool that does not correspond to the operational function for which the switch-off point in time is determined.

8. The apparatus for controlling operational functions of a machine tool according to claim 1, wherein the apparatus is configured to activate at least one device for determining a switch-off point in time when the power supply is switched off by operating the main switch of the machine tool such that the corresponding operational function is switched off without delay.

9. The apparatus for controlling operational functions of a machine tool according to claim 1, wherein the apparatus additionally has at least one device for determining a restart point in time when the operational function of the machine tool is re-activated after switching off.

10. The apparatus for controlling operational functions of a machine tool according to claim 6, wherein the device for determining a restart point in time is a device from the following group of devices:
    a device for determining a restart point in time when the main supply of the machine tool is switched on again after switching off;
    a device for determining a restart point in time when motor of the main drive of the machine tool is switched on again after switching off;
    a device for determining a restart point in time when the pressure of a sealing air supply of the machine tool is raised again after switching off,
    a device for determining a restart point in time when a power supply of a screen of the machine tool is increased again after switching off,
    a device for determining a restart point in time when a power supply of an illuminating device of the machine tool is increased again after switching off,
    a device for determining a restart point in time when a temperature of the cooling lubricant of the machine tool is increased again after switching off,
    a device for determining a restart point in time when a circulation of the cooling lubricant of the machine tool is increased again after switching off,
    a device for determining a restart point in time when a control computer of the machine tool is re-activated and optionally a machining program is started.

11. The apparatus for controlling operational functions of a machine tool according to claim 6, wherein at least one device for determining a restart point in time has equipment for determining the switch-on time by the user.

12. The apparatus for controlling operational functions of a machine tool according to claim 6, wherein the apparatus has a device for monitoring safety-relevant equipment and the device for determining a restart point in time is configured such that particular operational functions cannot be re-activated if the device for monitoring safety-relevant equipment detects a safety-hazardous operating state of the machine tool.

13. The apparatus for controlling operational functions of a machine tool according to claim 9, wherein the device for monitoring safety-relevant equipment comprises a sensor which detects whether there are any persons in the working space of the machine.

14. The apparatus for controlling operational functions of a machine tool according to claim 1, wherein the apparatus has a receiver for receiving a signal for controlling one of the devices for determining a switch-off point in time and/or one of the devices for determining a restart point in time.

15. The apparatus for controlling operational functions of a machine tool according to claim 14, wherein the receiver is adapted to receive the control signal by means of a Short Message Service (SMS) short message via a telecommunications network.

16. The apparatus for controlling operational functions of a machine tool according to claim 14, wherein the apparatus has an inquiry device that is adapted to transmit data relating to the operating state of the machine tool to an external station via a data communications network.

\* \* \* \* \*